United States Patent [19]
Lee et al.

[11] Patent Number: 5,579,253
[45] Date of Patent: Nov. 26, 1996

[54] COMPUTER MULTIPLY INSTRUCTION WITH A SUBRESULT SELECTION OPTION

[76] Inventors: Ruby B. Lee, 12933 Atherton Ct., Los Altos, Calif. 94022; Charles R. Dowdell, 5020 Alder Ct., Fort Collins, Colo. 80525; Joel D. Lamb, 1819 Etton Dr., Fort Collins, Colo. 80526

[21] Appl. No.: 300,609

[22] Filed: Sep. 2, 1994

[51] Int. Cl.$^6$ ................................................ G06F 7/52
[52] U.S. Cl. ................................................ 364/757
[58] Field of Search ........................... 364/735, 754, 364/757, 758, 759, 760

[56] References Cited

U.S. PATENT DOCUMENTS 4,809,212  2/1989  New et al. ............................. 364/757

*Primary Examiner*—Roy N. Envall, Jr.
*Assistant Examiner*—Chuong D. Ngo

[57] ABSTRACT

A N-bit by N-bit multiplication apparatus having the ability to select a part of the multiplication result for storage into a result register N-bits wide. A first embodiment of the invention allows a sequence of n-bits from the N-bit by N-bit multiply result to be stored into an N-bit wide register. N+1 to 1 multiplexors are utilized to select which of the multiply result bits are stored into the result register in response to a computer instruction. The second preferred embodiment utilizes multiplexors having fewer than N+1 inputs to select discrete subsets of the multiply result bits for storage into the N-bit wide result register. In this manner, less complex multiplexors are required which take less chip area to implement. The third preferred embodiment utilizes multiple sets of multiplexors to select multiple subresults generated by a parallel multiplication operation. The multiple subresults are stored in a single result register. By allowing subresults to be selected and stored as part of the multiply operation, a multiply apparatus according to the present invention is more time and instruction efficient than prior art devices.

6 Claims, 7 Drawing Sheets

COMPUTER MULTIPLY INSTRUCTION WITH A SUBRESULT SELECTION OPTION

FIELD OF THE INVENTION

The present invention relates to the design of computer central processing units (CPUs) and, in particular, to the implementation of multiply instructions in the CPUs.

BACKGROUND OF THE INVENTION

Typical computer integer or fixed-point multiply instructions take two operands each N-bits wide and multiply them together to produce a result 2N-bits wide. Being 2N bits wide, the result needs to be stored, typically, in two separate registers each N-bits wide. To get both N-bit portions of the result, typically two separate instructions need to be executed by the computer. The first instruction stores the high N-bits of the result in a first register and the second instruction stores the low n-bits of the result in a second register with both the first and second registers being N-bits wide. FIG. 1 illustrates the multiply process where two 2-bit operands 101 and 103 are multiplied together by a multiplier 105 to produce a 4-bit result 107. The result 107 is then stored in two 2-bit registers 109 and 111 where register 109 holds bits R1–R2 and register 111 holds bits R3–R4.

In many applications the entire 2N-bit result is not required but instead a subset of the 2N-bits is of interest. If this is just the low or high N-bits, then one instruction suffices. However, an application may require the middle N-bits of the result of a multiply operation. To position the middle resultant N-bits (a subresult) into a single N-bit register requires multiple multiply and post multiply operations.

The present invention is an improved way to align a subresult of a multiply instruction such that the subresult is stored into a single computer register without requiring post multiply operations.

SUMMARY OF THE INVENTION

In accordance with a first preferred embodiment of the present invention, a computer system is presented which facilitates the efficient alignment of multiplication subresults into a single register. Preferably, the desired subresult is selected by control circuitry, which directs a plurality of multiplexers to cause the desired subresult to be placed into a result register. There are "N", N+1 to 1, multiplexers. Each multiplexor controls a single unique bit position in the result register and controls which of a subset of resultant bits is directed into that unique position. The control circuitry decodes a computer instruction and directs the multiplexers to select the appropriate subresult bits to be stored in the result register.

For example, if N=8 (an 8-bit by 8-bit multiply), then eight multiplexers each having nine inputs would be utilized to store a subresult into an 8-bit result register. In this way any subresult, consisting of a contiguous sequence of 8-bits, is selectable for storage in the result register. This process requires no post multiply alignment operations and is therefore very time efficient.

In a second preferred embodiment of the present invention, control circuitry selects one of a discrete number of subresults to be stored in a result register where the number of discrete subresults is less than N+1. As such, the multiplexers are less complex (have fewer inputs) than required in the first preferred embodiment.

For example, if N=8, generating a multiplication intermediate result having 16-bits (1–16), and the subresult selection was between the subresults with starting bits 1, 5 and 9, then eight multiplexers each having three inputs would be utilized to store one of the three subresults into the 8-bit result register. Because less complex multiplexers are required, this second embodiment is easier to implement in a microprocessor where chip silicon area needs to be optimally used.

In a third preferred embodiment, a subresult selection circuit selects two subresults from two intermediate results. The intermediate results are generated from a parallel multiplication operation where two pairs of operands packed in two operand registers are multiplied together. The two subresults are placed into a single result register such that the result register holds two discrete final results.

The present invention affords significant performance benefits for operations performed by a computing system which requires a selection of multiplication subresults into a single computer register over what is available with prior art systems.

DETAILED DESCRIPTION OF THE INVENTION

Figure 1:
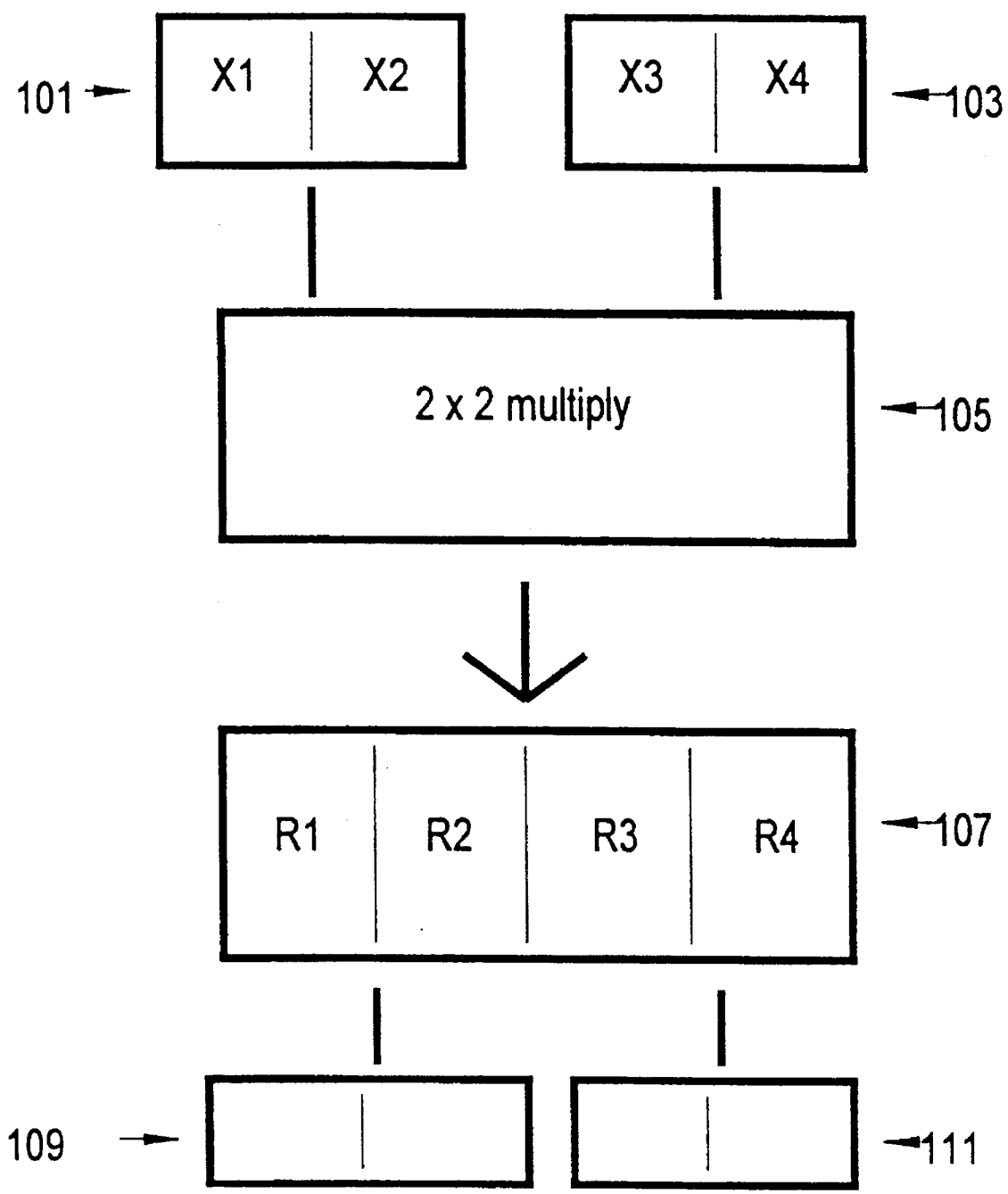
FIG. 1 is a simplified illustration of a 2-bit×2-bit multiply operation yielding a 4-bit result.

In the following description, reference numerals will be used to refer to specific features in the accompanying drawings. The first digit of a three digit reference number indicates the first drawing where that particular feature was discussed. For example, reference number 101 refers to a feature in FIG. 1.

Figure 2:
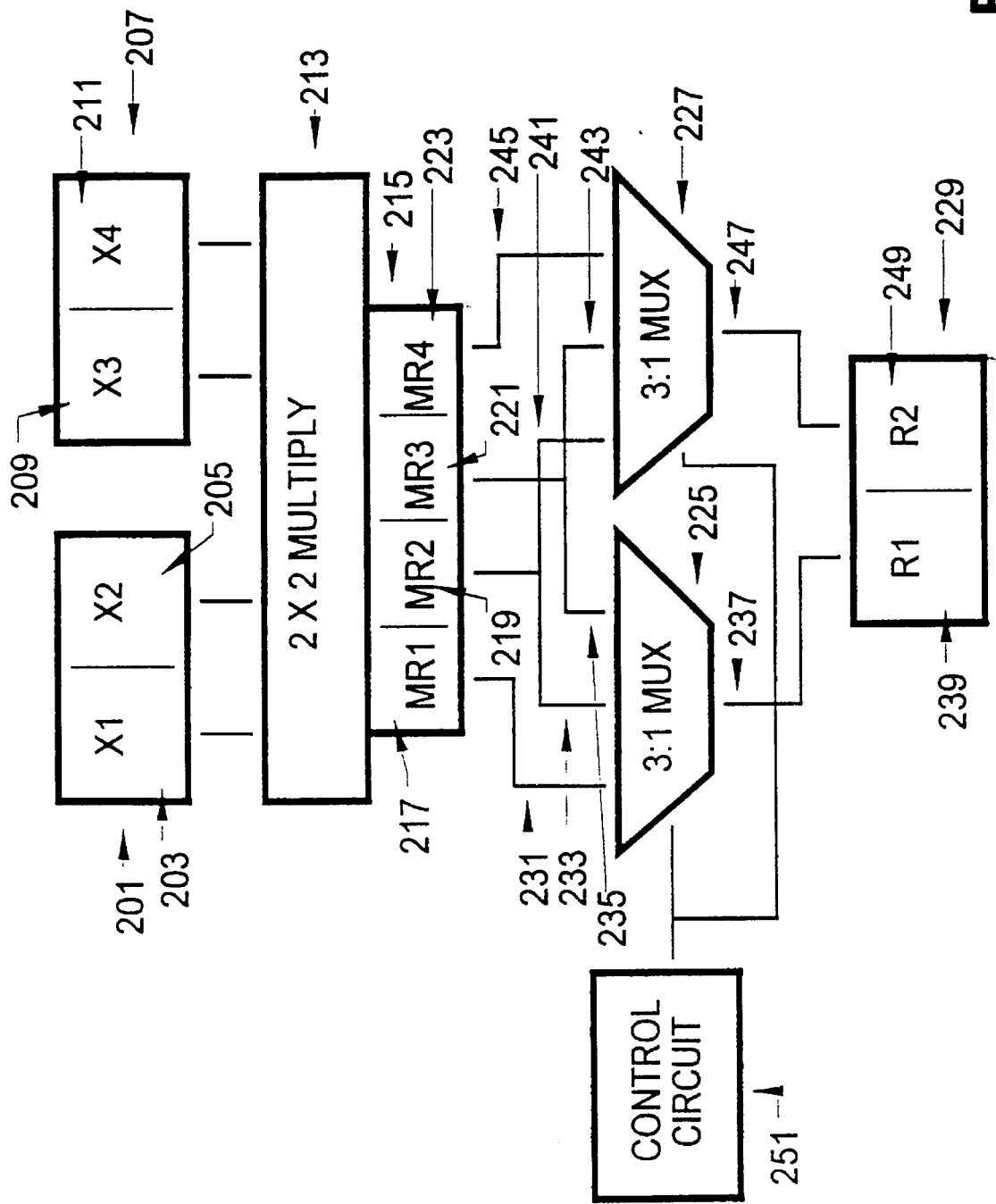
FIG. 2 illustrates a 2-bit by 2-bit multiplication apparatus according to a first preferred embodiment of the present invention.

In a first preferred embodiment of the present invention, multiple multiplexers are utilized to select a particular subresult of a multiplication operation performed by a computer. FIG. 2 illustrates the first preferred embodiment as it is implemented in a 2-bit by 2-bit multiplication operation. A first operand 201 includes bits "X1" 203 and "X2" 205. A second operand 207 includes bits "X3" 209 and "X4" 211. These two operands 201 and 207 are multiplied together by a hardware multiplier 213 as is well known in the art. The multiplication operation produces a 4-bit multiplication result 215. The four bits are "MR1" 217, "MR2" 219, "MR3" 221 and "MR4" 223.

From the 4-bit multiplication result three 2-bit subresults are possible. The three possible subresults are (MR1–MR2), (MR2–MR3) and (MR3–MR4). Two three inputs to one output (3:1) multiplexers 225 and 227 are provided to select which of the three possible subresults is stored into a 2-bit result register 229.

Multiplexer 225 has three inputs 231, 233 and 235 connected to bits "MR1", "MR2" and "MR3" respectively. The output 237 of multiplexer 225 controls bit position "R1" 239 in the result register 229. By this arrangement, multiplexer 225 selects which of bits MR1, MR2 or MR3 is stored into bit position R1 in the result register 229.

In like manner multiplexer 227 has three inputs 241, 243 and 245 connected to bits MR2, MR3 and MR4 respectively. The output 247 of multiplexer 227 controls bit position "R2" 249 in the result register 229. This arrangement enables multiplexer 227 to select which of bits MR2, MR3 or MR4 is stored into bit position R2 in the result register 229.

A control circuit 251 causes the two multiplexers 225 and 227 to select the appropriate subresult to be stored into result register 229 in response to a computer instruction not illustrated. For example, if subresult MR2–MR3 is to be stored into the result register 229, then the control circuitry will control multiplexer 225 to select bit MR2 for storage into bit position R1. In like manner, the control circuitry will control multiplexer 227 to select bit MR3 for storage into bit position R2.

Figure 3:
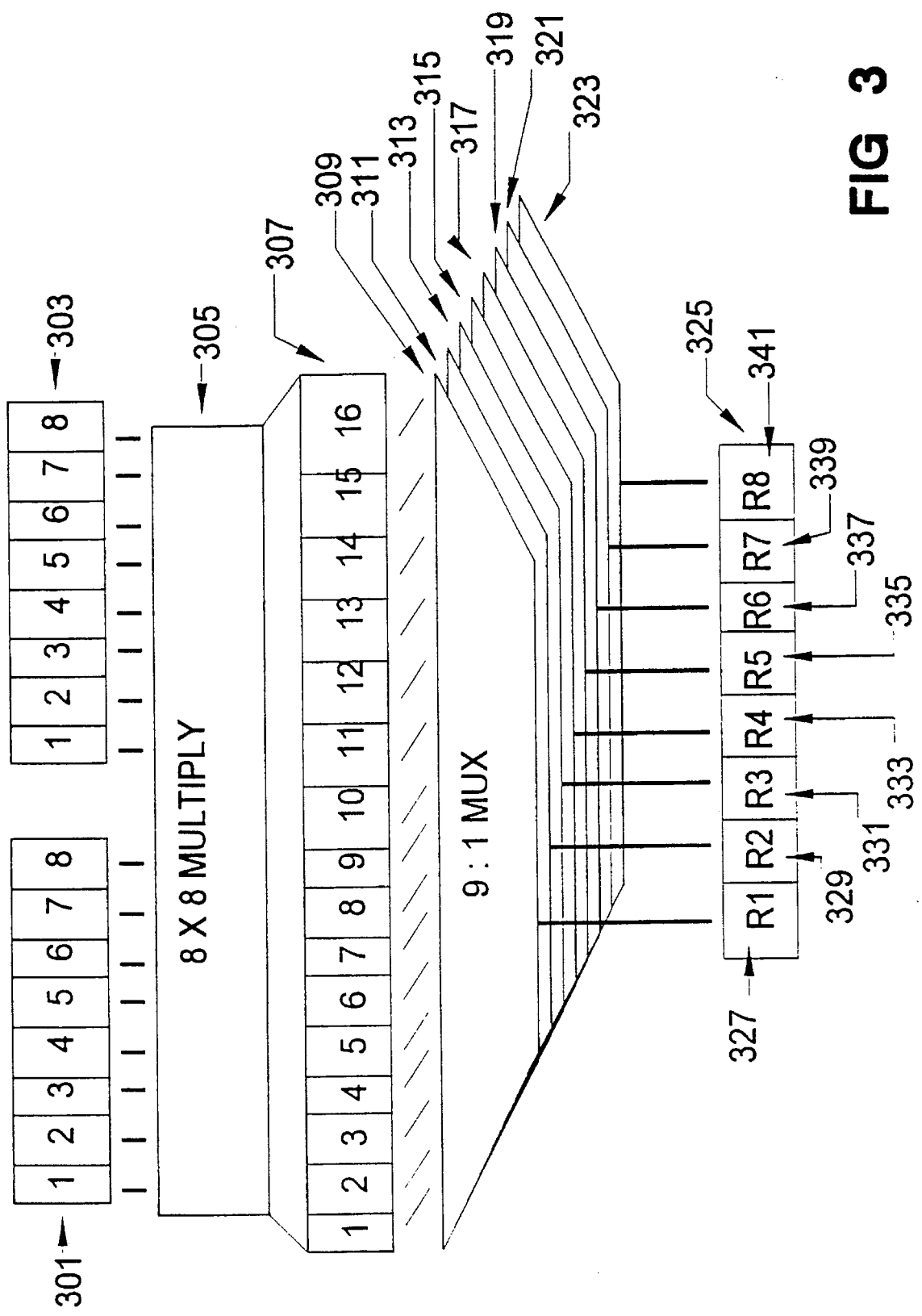
FIG. 3 illustrates an 8-bit by 8-bit multiplication apparatus according to the first preferred embodiment of the present invention.

FIG. 3 illustrates the present invention as applied to an 8-bit by 8-bit multiplication apparatus. As illustrated, two 8-bit operands 301 and 303 are multiplied together by a multiplier 305 thereby generating a 16-bit intermediate result 307. Eight 9-input to 1 output (9:1) multiplexers 309–323 select eight of the 16-bits 307 for storage into an 8-bit register 325. Each of the multiplexers 309–323 controls a unique bit position "R1"–"R8", 327–341 respectively, in the result register 325.

The nine inputs of the multiplexers 309–23 are connected to nine of the intermediate bits where multiplexer 309 is connected to bits 1–9, multiplexer 311 is connected to bits 2–10 and so on with multiplexer 323 being connected to bits 8–16 of the intermediate result 307. Control circuitry (not shown) controls which eight bits of the intermediate result the multiplexers store in the result register 325 in response to a computer instruction. In this manner any subresult (1–8), (2–9), ..., (9–16) can be stored in the result register.

As is understood by one skilled in the art, while each of the 9:1 multiplexers are illustrated as a single discrete multiplexer, each multiplexer may in practice consist of a number of smaller, simpler, multiplexers connected together to achieve the 9:1 multiplex function.

While the first preferred embodiment of the present invention affords great flexibility in subresult selection, such flexibility is not always needed. For example, often only a discrete number of subresults are of interest where the subresults are separated by 4-bits (subresults 1–8, 5–12 etc). Therefore some flexibility can be sacrificed, and increased design compactness achieved, by using multiplexers having fewer inputs. In the second preferred embodiment of the present invention simplified multiplexers are utilized to select discrete subresults.

Figure 4:
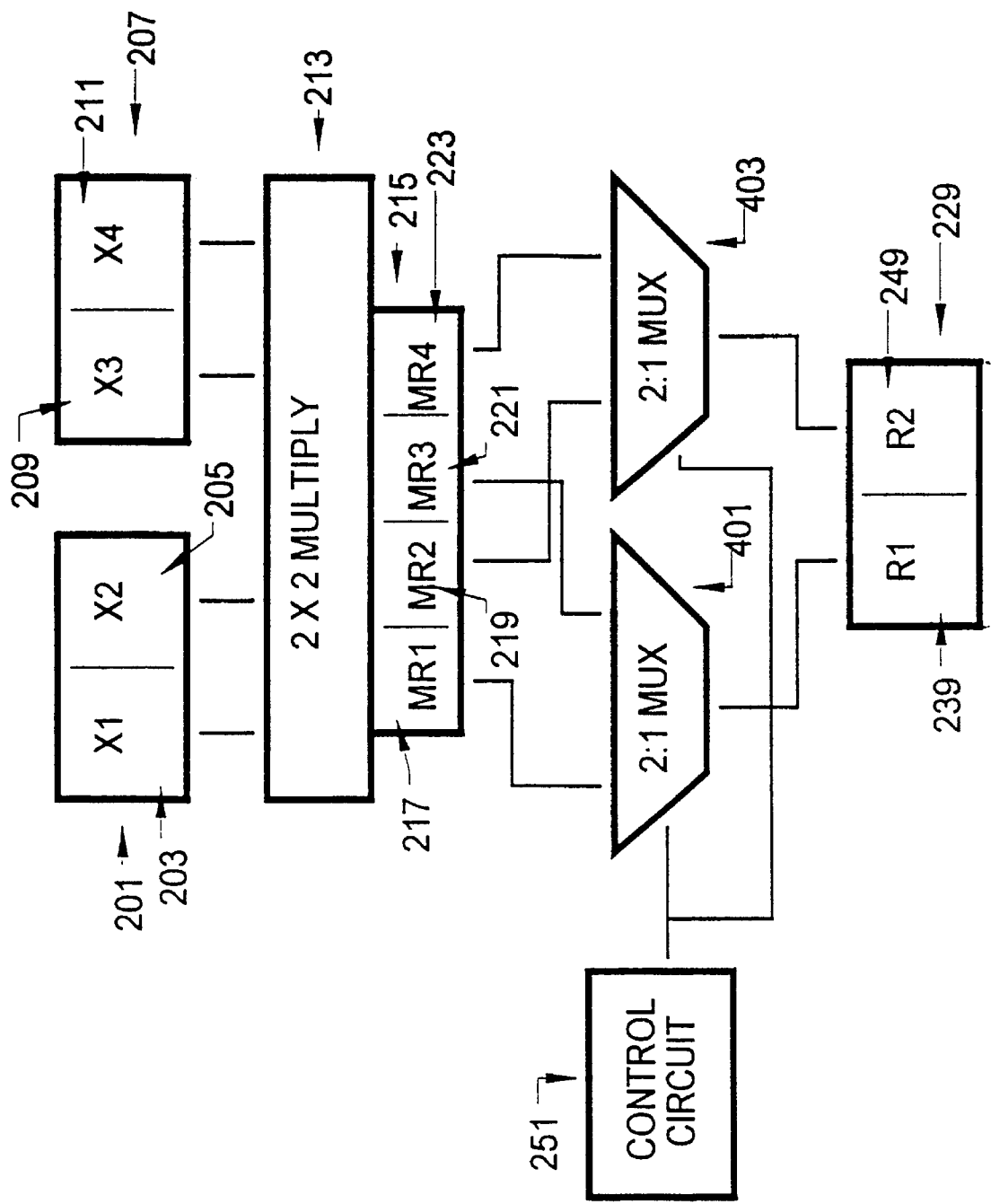
FIG. 4 illustrates a 2-bit by 2-bit multiplication apparatus according to a second preferred embodiment of the present invention.

FIG. 4 illustrates the second preferred embodiment of the invention applied to a 2-bit by 2-bit multiplication. The operation of this multiplier and selection apparatus is as described in association with FIG. 2 with the exception of the two 2:1 bit multiplexers 401 and 403 being utilized instead of the 3:1 bit multiplexers in FIG. 2. Multiplexer 401 selects either bit "MR1" 217 or bit "MR3" 221 for storage into the result register 229 bit position "R1" 239.

Therefore, either subresult (MR1–MR2) or subresult (MR3–MR4) can be selected by the multiplexers for storage into the result register 229. Since two input multiplexers take less chip real estate than three input multiplexers, it is easier to design a microprocessor to utilize this advantageous apparatus than the apparatus described in association with the first preferred embodiment. However, this design simplicity is achieved at the cost of flexibility.

Figure 5:
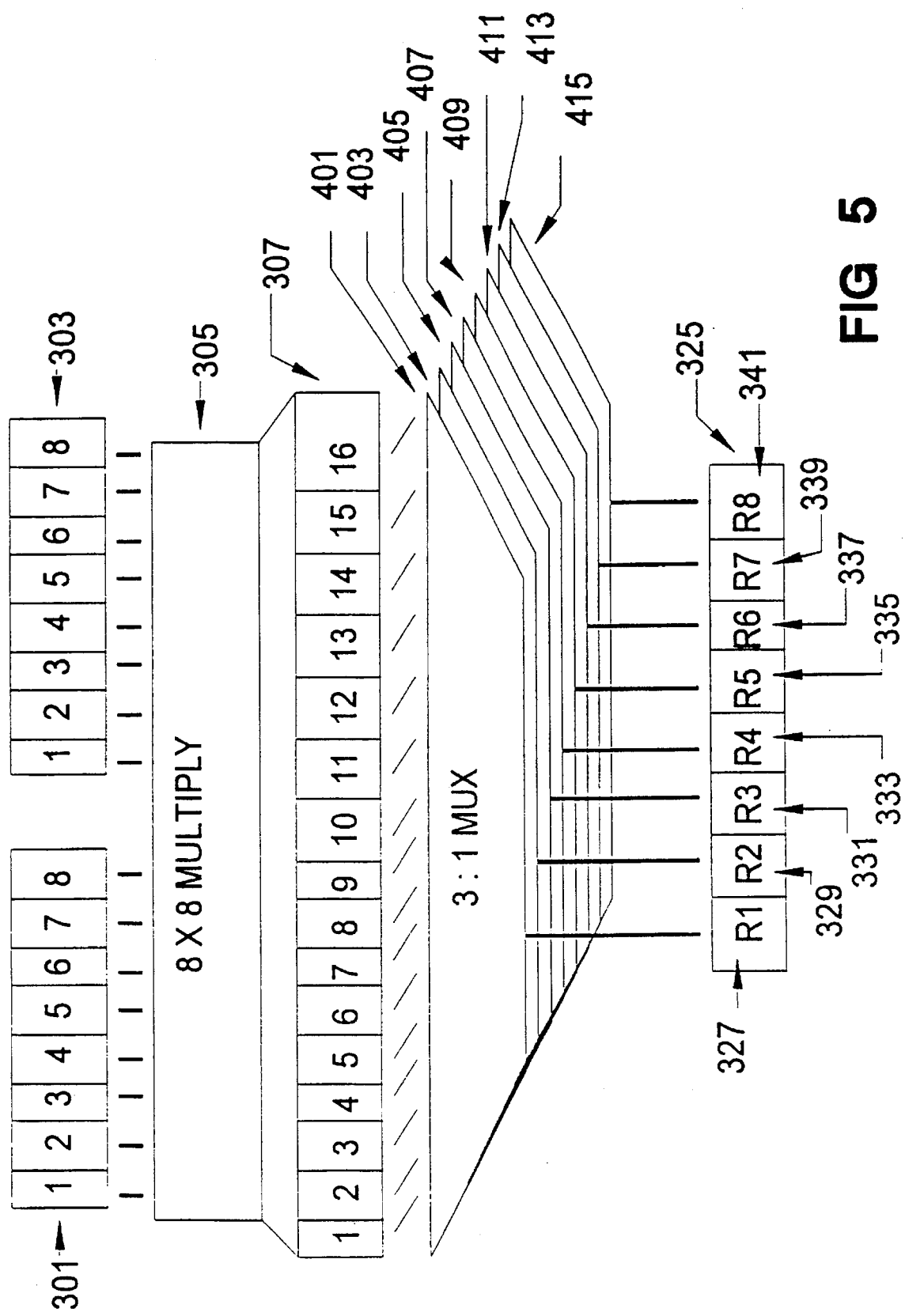
FIG. 5 illustrates an 8-bit by 8-bit multiplication apparatus according to the second preferred embodiment of the present invention.

FIG. 5 illustrates the second preferred embodiment of the present invention as applied to a 8-bit by 8-bit multiplication. The operation of the apparatus is essentially the same as described in association with FIG. 3 except that three input to one output multiplexers 401–415 replace the 9:1 multiplexers previously described. Each multiplexer is connected to three bits of the intermediate result 307 with multiplexer 401 being connected to bits (1,5 and 9), multiplexer 403 being connected to bits (2, 6 and 10), ..., and finally with multiplexer 415 being connected to bits (8, 12 and 16).

Therefore the multiplexers can select every fourth subresult (1–8, 5–12 and 9–16) to be stored in the result register 325 in response to control circuitry (not shown). Of course any other set of subresults can be selected by controlling which intermediate result bits are connected to which multiplexers. Also a larger number of subresults can be selected by increasing the complexity of the multiplexers as is understood by those skilled in the art.

Figure 6:
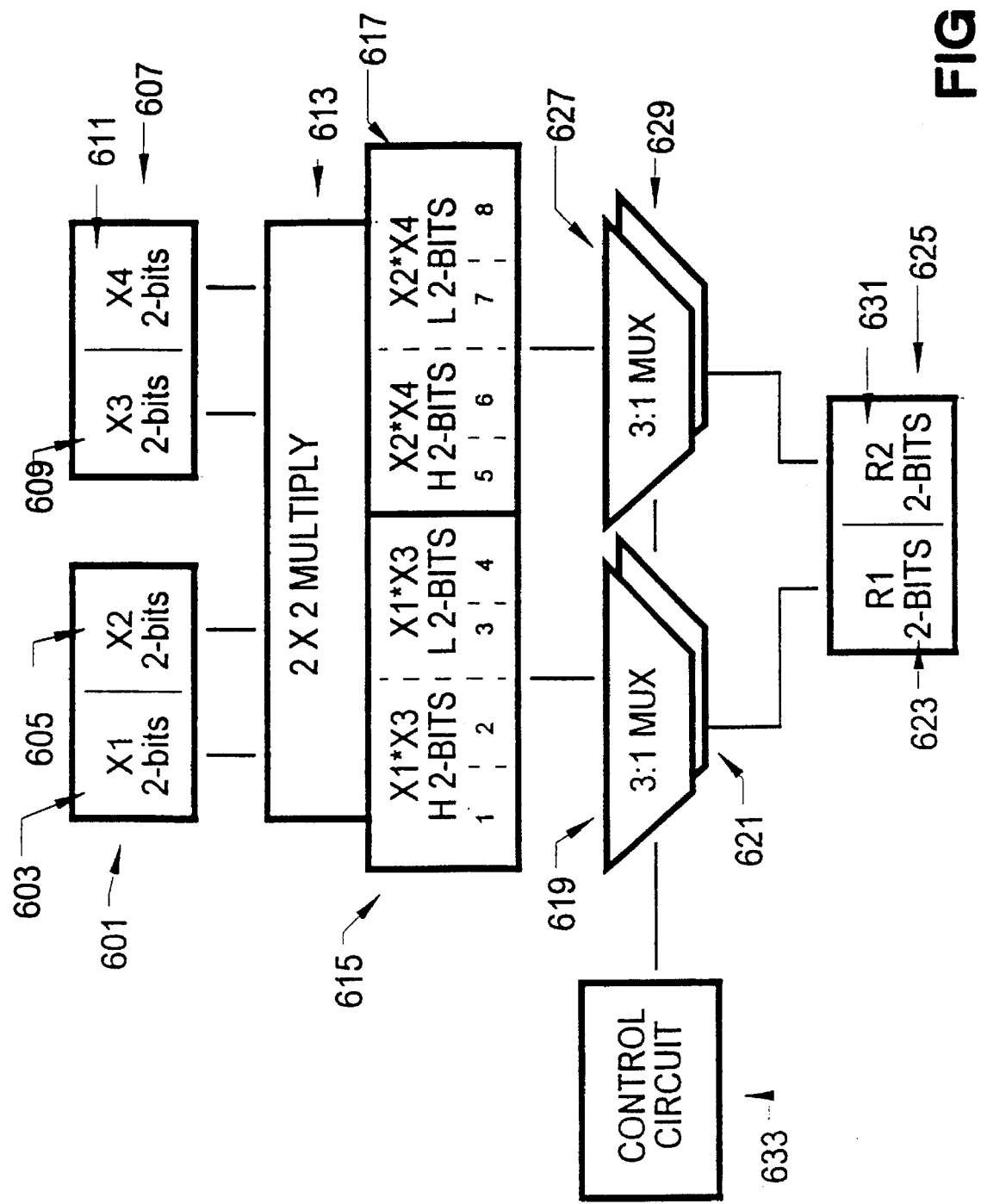
FIG. 6 illustrates a parallel multiply operation for four operands contained in two operand registers.

In a third preferred embodiment of the invention, multiplication subresult selection is applied to parallel multiplication. As illustrated in FIG. 6, a first 4-bit operand register 601 is divided into two fields 603 and 605. Field 603 contains a 2-bit operand "X1" and field 605 contains a 2-bit operand "X2". A second 4-bit operand 607 contains two 2-bit operands "X3" 609 and "X4" 611. A multiplier 613 performs two 2-bit by 2-bit multiplication operations thereby producing two 4-bit intermediate results 615 and 617. The first 4-bit intermediate result 615 is produced by multiplying operands X1 and X3 together. In like manner, the second intermediate result 617 is produced by multiplying operands X2 and X4 together. The 4-bit intermediate results 615 and 617 consist of two high and two low bits.

A pair of 3:1 multiplexers 619 and 621 select which two of the four bits (a subresult) of the first intermediate result 615 are placed into a first field 623 in a 4-bit result register 625. Likewise, two 3:1 multiplexers 627 and 629 select which two of the four bits of the second intermediate result 617 are placed into a second field 631 in the result register 625.

A control circuit 633 controls which of the subresults the multiplexers 619–621 and 627–629 select. The control circuit 633 controls the multiplexers appropriately in response to a computer multiply with select instruction. Typically, the pair of multiplexers are controlled such that they select the same subresult from each of the intermediate results 615 and 617. For example, if multiplexer pair 619–621 selects the second subresult from the intermediate result 615 (X1*X3 intermediate result bits 2 and 3), then the multiplexer pair 627–629 will select the second subresult from the intermediate result 617 (X2*X4 intermediate result bits 2 and 3).

In the same manner as previously discussed in association with the second embodiment, instead of selecting from all possible subresults possible from intermediate results 615 and 617, simpler multiplexers can be used to select from a subset of the possible subresults. Also, this invention can be expanded to computers having registers greater than 4-bits. For example, in a 64-bit computer, operand registers 601 and 607 would each contain four 16-bit operands and the multiplier 613 would perform four 16-bit by 16-bit multiplication operations.

Figure 7:
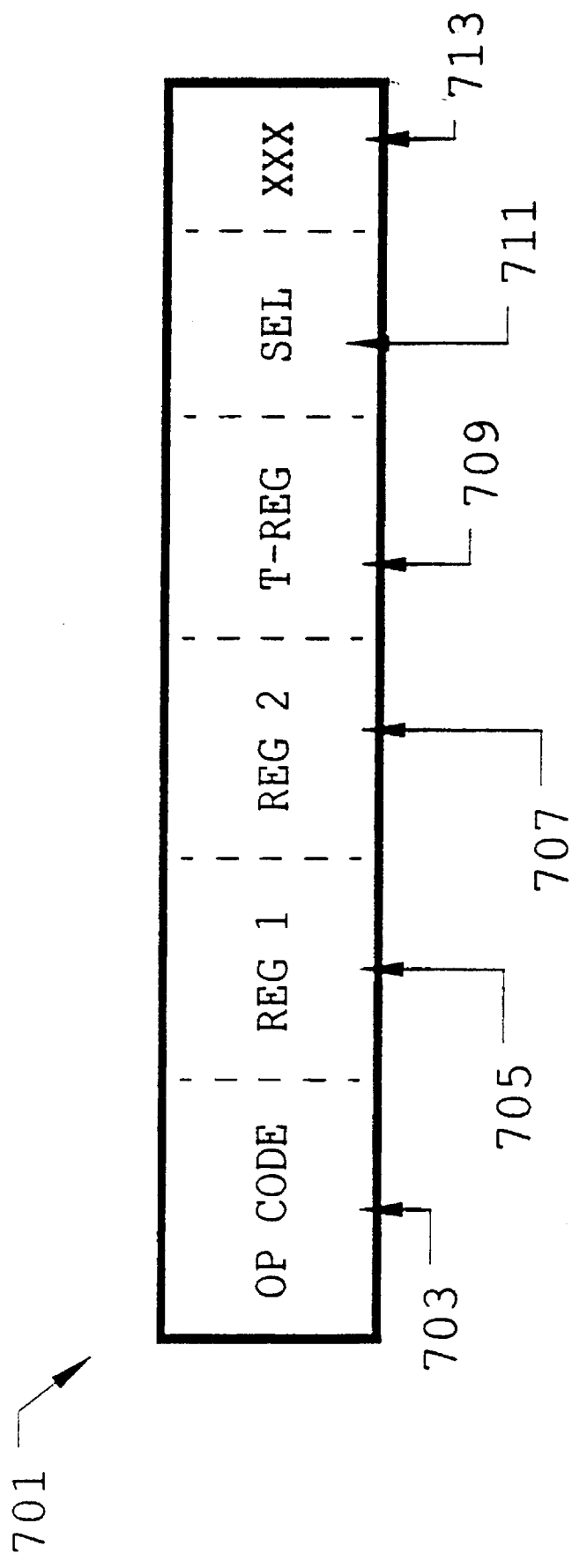
FIG. 7 illustrates a multiply with select computer instruction.

FIG. 7 illustrates a computer instruction for a multiply with select operation. The computer instruction 701 has six fields 703–713. The first field 703 is an op-code field that, when decoded, controls the computer to perform a multiply with select operation. As is known in the art, any predetermined value can be used as an op-code to appropriately control the computer. The second and third fields 705 and 707, respectively, identify the two operand registers that contain the operands to be multiplied together. The final result of the multiply with select operation is stored in a target register identified by a value in the fourth field 709.

A select field 711 contains a value which represents which subresult of the multiplication intermediate result is selected for storage in the target register. The sixth field 713 represents other information in the instruction for functions not related to this invention. As is understood by those skilled in the art, the instruction 701 format and values are necessarily optimized for a particular computer and will vary as required.

Both the first, second and third preferred embodiments provide for a time efficient selection of multiplication subresults for storage in a result register smaller than the multiplication result. This selection is performed without additional post multiplication operations having to be performed. Also as is apparent to those skilled in the art, this invention can be advantageously applied to computers having larger registers than the examples herein. In particular, this invention is applicable to computers having 32 and 64-bit word lengths.

Also while the invention has been described utilizing multiplexers having a maximum of N+1 inputs, multiplexers having up to 2N−1 inputs can be advantageously employed. Multiplexers having more than N+1 inputs, therefore capable of selecting a subresult with fewer than N-bits, is useful for performing a multiply with select operation combined with a divide function.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computing apparatus for multiplying operand and aligning multiplication results into a single register, comprising:

a first N-bit operand register having a first operand;

a second N-bit operand register having a second operand;

a multiplier circuit operative to multiply the first and the second operands together, thereby producing as an output an intermediate result that is 2N-bits wide having N high bits and N low bits; and a bit selection circuit including a plurality of multiplexers wherein each of said multiplexers is operative in response to a multiply with select computer instruction to select a respective one of a fixed set of intermediate result bits and place a bit so selected into a particular bit location in a result register, wherein bits of said intermediate result output by said multiplier circuit are selected from both the N high bits and the N low bits, such that a subresult is stored in a single register without requiring post multiply operations;

wherein each of said multiplexers selects said respective one of a fixed set of intermediate result bits from an intermediate result having at least N+1 intermediate result bits.

2. A computing apparatus as in claim 1 wherein:

the bit selection circuit includes N multiplexers, where each of said N multiplexers is operative to place a selected intermediate result bit into a unique bit location in the result register.

3. A computing apparatus as in claim 2 wherein:

each of said N multiplexers selects one bit from one of a plurality of subsets of intermediate result bits, where each of said N multiplexers selects said one bit from a subset of intermediate bits different than that from which any other of said N multiplexers selects.

4. A computing apparatus for multiplying operand and aligning multiplication results into a single register, comprising:

a first N-bit operand register having a first operand;

a second N-bit operand register having a second operand;

a multiplier circuit operative to multiply the first and the second operands together, thereby producing as an output an intermediate result that is 2N-bits wide having N high bits and N low bits; and a bit selection circuit including a plurality of multiplexers, wherein each of said multiplexers is operative in response to a multiply with select computer instruction to select one of a plurality of subsets of the 2N-bits wide intermediate result bits, wherein each of said multiplexers is operative to place a bit so selected into a particular bit location in a result register, wherein at least one of the plurality of subsets includes bits from both the N high bits and the N low bits, such that a subresult is stored in a single register without requiring post multiply operations;

wherein each of said multiplexers selects said respective one of a plurality of subsets of intermediate result bits from an intermediate result having at least N+1 intermediate result bits.

5. A computing apparatus as in claim 4 wherein:

the bit selection circuit includes N multiplexers where each of said N multiplexers is operative to place a selected intermediate result bit into a unique bit location in the result register.

6. A computing apparatus for multiplying operand and aligning multiplication results into a single register, comprising:

a first 2N-bits wide operand register having a first and a second N-bit wide operand;

a second 2N-bits wide operand register having a third and a fourth N-bit wide operand;

a multiplier circuit operative to multiply the first and the third operands together, thereby producing a first 2N-bits wide intermediate result having N high bits and N low bits wherein said multiplier circuit is also operative to multiply the second and the fourth operands together, thereby producing a second 2N-bits wide intermediate result having N high bits and N low bits; and a bit selection circuit including a plurality of multiplexers, wherein a first multiplexer of said bit selection circuit, in response to a multiply with select computer instruction, is operative to select one bit of a fixed set of first intermediate result bits, and to place the bit so selected into a first bit location in a result register; and wherein said bit selection circuit is also operative to select one bit of a fixed set of second intermediate results and to place the bit so selected into a second bit location in the result register, such that a subresult is stored in a single register without requiring post multiply operations;

wherein each of said multiplexers selects said respective one bit of a fixed set of intermediate result bits from an intermediate result having at least N+1 intermediate result bits.

* * * * *